United States Patent [19]

Melzig et al.

[11] Patent Number: 4,852,974

[45] Date of Patent: Aug. 1, 1989

[54] ANTI-REFLECTION FILM FOR AN OPTICAL ELEMENT CONSISTING OF AN ORGANIC MATERIAL

[75] Inventors: Manfred Melzig, Wessling; Erhard Effer, Pöcking, both of Fed. Rep. of Germany

[73] Assignee: Optische Werke G. Rodenstock, Munich, Fed. Rep. of Germany

[21] Appl. No.: 41,101

[22] PCT Filed: Jul. 21, 1986

[86] PCT No.: PCT/DE86/00299

§ 371 Date: Mar. 19, 1987

§ 102(e) Date: Mar. 19, 1987

[87] PCT Pub. No.: WO87/00641

PCT Pub. Date: Jan. 29, 1987

[30] Foreign Application Priority Data

Jul. 19, 1985 [DE] Fed. Rep. of Germany ....... 3525892

[51] Int. Cl.$^4$ ............................ G02B 5/26; G02B 5/23; G02B 1/10
[52] U.S. Cl. ....................................... 350/165; 350/1.6
[58] Field of Search ................. 350/165, 1.6, 166, 164

[56] References Cited

U.S. PATENT DOCUMENTS 3,410,625 11/1968 Edwards .............................. 350/1.6
4,320,936 3/1982 Sawamura ........................... 350/1.6

OTHER PUBLICATIONS

M. Blanc, "Nouveaux Filtres Interférentiels pour le Proche Ultraviolet", 6-12-79, pp. 1313-1325, Optica Acta, 1980, vol. 27, No. 9.

Primary Examiner—Bruce Y. Arnold
Assistant Examiner—Terry S. Callaghan
Attorney, Agent, or Firm—Antonelli, Terry & Wands

[57] ABSTRACT

An anti-reflection film of several layers is described for an optical element consisting of an organic material with photochromic properties.

The film according to the invention is characterized by the fact that the mean reflection of the film over the spectral range between 330 nm and 380 nm is less than 4% and the mean reflection over the range between 290 nm and 330 nm is greater than 15%. This reflection behavior serves to prevent the stimulation of the photochromic effect by light with too short a wavelength from reducing the useful life of the photochromic effect. In addition, a suitable choice of the reflection properties means that a deliberate stimulation of photochromic molecules situated in certain steric positions and so influence on the kinetics and color of the photochromic effect can be obtained.

6 Claims, 3 Drawing Sheets

ANTI-REFLECTION FILM FOR AN OPTICAL ELEMENT CONSISTING OF AN ORGANIC MATERIAL

TECHNICAL BACKGROUND

The invention relates to an anti-reflection film for an optical element consisting of an organic material with photochromic properties, and in particular to a spectacle lens of this type.

STATE OF THE ART

In the past a number of proposals have become known to design optical elements consisting of an organic material and, in particular, spectacle lenses consisting of an organic material with photochromic properties. In this context "photochromic" is to be understood as the property of the colour impression and of the darkening of the optical element of changing with the amount of illumination, i.e. with the intensity of the radiation.

The photochromic properties of optical elements consisting of an organic material are, as a rule, obtained by introducing organic substances with photochromic properties, for example, spiro-oxazine compounds, into the matrix of the optical element or by applying them to the optical element.

On the other hand, at present most spectacle lenses are provided with an anti-reflection film which will usually consist of several high refractive index and low refractive index layers. Up until now, the question as to which anti-reflection film is best suited to a spectacle lens consisting of an organic material with photochromic properties has not been considered in the literature. The same anti-reflection films are applied to actually developed spectacle lenses consisting of an organic material with photochromic properties as are also used for spectacle lenses consisting of an organic material without photochromic properties.

SUMMARY OF THE INVENTION

It has now been recognised in accordance with this invention that the properties of spectacle lenses consisting of an organic material into which photochromic substances have been introduced or onto which photochromic substances have been applied, can be influenced by the suitable choice of an anti-reflection film.

For this reason, it is the object of this invention to provide an anti-reflection film on an optical element consisting of an organic material with photochromic properties.

In accordance with this invention it has been recognised that an anti-reflection film of several layers for an optical element consisting of an organic material with photochromic properties must possess the following characteristics:

1. In the wavelength range between 330 nm and 380 nm the reflection should be as low as possible to ensure a sufficient stimulation of the photochromic substance or, in the case of several substances having been introduced, of the different substances.

2. In the wavelength range below 330 nm the reflection should increase steeply as radiation in this wavelength range, which also stimulates the photochromic effect, will—as has also been recognised in accordance with the invention—reduced the life of the photochromic effect.

3. In the wavelength range below 290 nm the reflection properties of the anti-reflection film no longer play a decisive role as the absorption properties of the atmosphere prevent such radiation from stimulating and so perhaps damaging the organic substances to any noticeable extent.

This means that the anti-reflection film provided in accordance with this invention differs from the films used up to now for both spectacle lenses in plastic without photochromic properties and for such with photochromic properties in that it has defined reflection properties not only in the range of visible light from 380 nm to 780 nm but also in the range from 290 nm to 380 nm. No consideration has been given up to now to the curve behaviour below 380 nm.

The film in accordance with the invention provided on an optical element consisting of an organic material and, in particular, for a spectacle lens with photochromic properties has the following advantages:

It ensures a sufficient stimulation of the photochromic effect in dependence on the pertaining amount of illumination. As a result, when the anti-reflection film according to the invention is used, the kinetics of the photochromic effect is better than when conventional films are used.

It prevents the life of the photochromic effect from being reduced by the stimulation of the photochromic effect by light with too short a wavelength.

In addition, further unexpected advantages are produced by the use of the photochromic film according to the invention:

Due to the different steric positions of the photochromic molecules in the plastic matrix, these molecules show different absorption and kinetic properties. With a suitable choice of the reflection properties of the film a deliberate stimulation of photochromic materials situated in certain steric positions and so influence on the kinetics and colour of the photochromic effect can be obtained.

If at least two different photochromic substances which have different absorption spectra are integrated in the matrix of the optical element, which, for example, may consist of organic material, then a considerable influence on the colour of the photochromic effect can be obtained by means of the design of the reflection properties in the range between 290 nm and 380 nm.

As has further been recognised in accordance with the invention, the properties according to the invention of the anti-reflection film for an optical element consisting of an organic material with photochromic properties can only be fulfilled with a layer system of more than three layers. Preferred version forms of this layer system are hereinafter described. With a film which has 5 layers consisting alternately of silicon dioxide and a material with a high refractive index, the behaviour provided in accordance with the invention between 290 nm and 380 nm can only be obtained satisfactorily, if the high-index material has a refractive index $n_e$ which is at least 2.0.

BRIEF DESCRIPTION OF THE DRAWING

The invention described in more detail below by means of version example with reference to the drawing in which.

METHOD OF PERFORMING THE INVENTION

Figure 1:
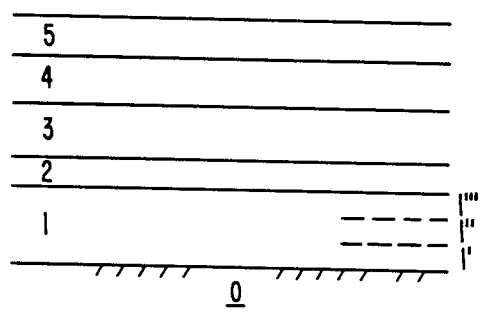
FIG. 1 shows a film in accordance with the invention with 5 layers and FIGS. 2–5 show reflection curves of different version examples.
Figure 2:
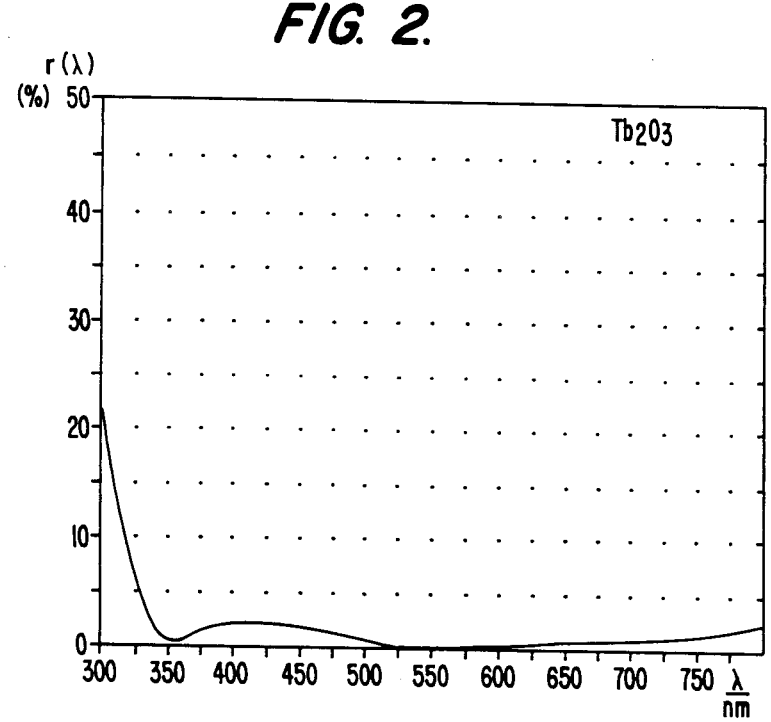
Figure 3:
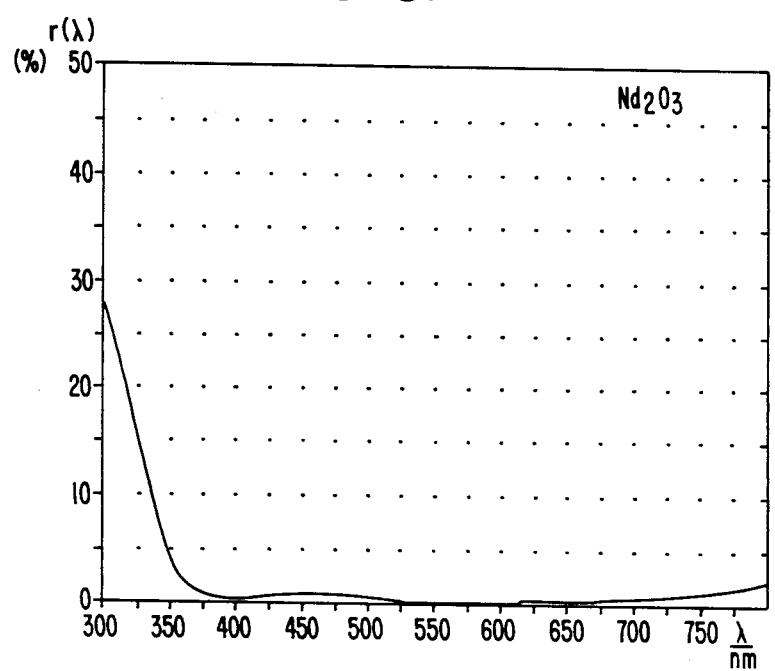
Figure 4:
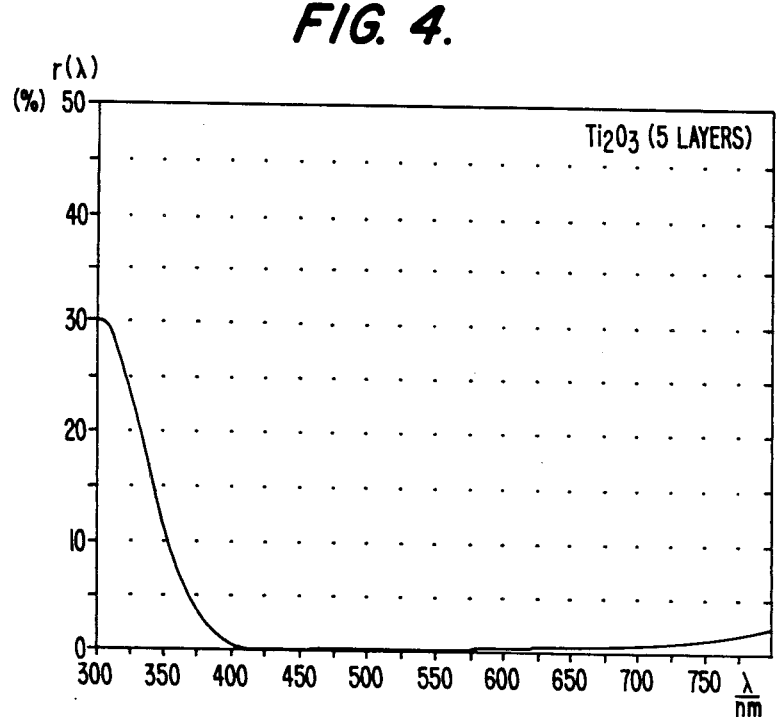
Figure 5:
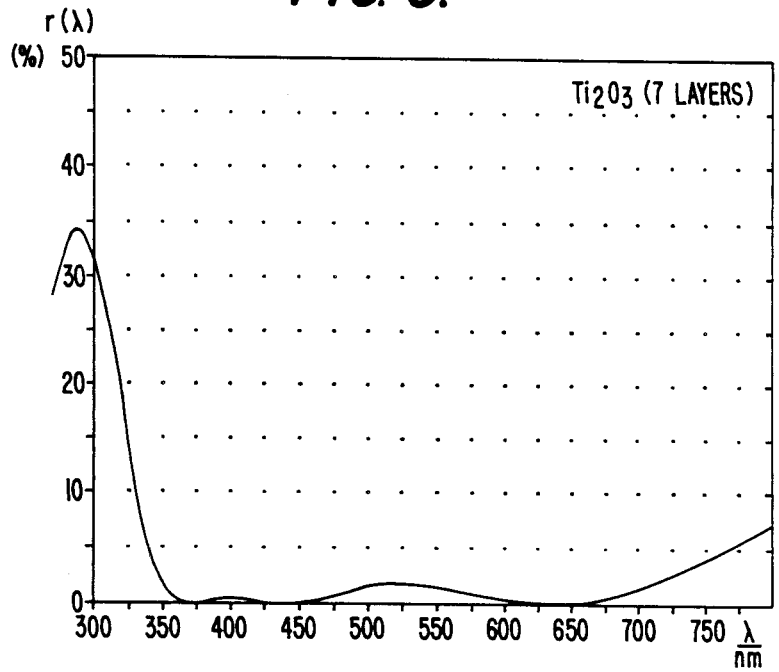

FIG. 1 shows a film in accordance with the invention with 5 layers of which the first layer 1 applied directly to the optical element 0 consists of $SiO_2$, the second layer 2 of a high-index metal oxide, the third layer 3 of $SiO_2$, the fourth layer 4 again of a high-index metal oxide and the fifth layer 5 consists of $SiO_2$.

Furthermore, it is also possible to split up layer 1 into three partial layers 1', 1'', 1''' consisting of $SiO_2$, a high-index metal oxide and $SiO_2$.

In the following Table 1, the design of the layer system with 5 layers is shown for different high-index materials (HIM) as is the refractive index $n_e$ of the high-index material, i.e. the refractive index for light with a wavelength of 546.1 nm. It is assumed here that the substrate 0 has a refractive index of (about) 1.502.

TABLE 1

| HIM Layer/$n_e$ | $Tb_2O_3$ 2.00 | $Nd_2O_3$ 2.10 | $Ti_2O_3$ 2.33 |
|---|---|---|---|
| 1 ($SiO_2$) | 175 | 175 | 180 nm |
| 2 (HIM) | 17.3 | 14.2 | 12.9 nm |
| 3 ($SiO_2$) | 36.4 | 37.1 | 35.3 nm |
| 4 (HIM) | 121.3 | 123.8 | 120.8 nm |
| 5 ($SiO_2$) | 87.5 | 87.5 | 91.2 nm |

In Table 2 a version example is shown for a layer system with 7 layers.

TABLE 2

HIM: $Ti_2O_3$; $n_e$ = 2.23

| 1' ($SiO_2$) = 50; | 1'' (HIM) = 5.2; | 1''' ($SiO_2$) = 112.3 |
|---|---|---|
| 2 (HIM) = 10.9; | 3 ($SiO_2$) = 37.3; | 4 (HIM) = 115.6 |
| 5 ($SiO_2$) = 78.4 | | |

FIGS. 2 to 5 show the reflection factors $r(\lambda)$ (in %) of the layer systems shown in Table 1 or 2 as a function of the wavelength $\lambda$ of the incident light. As a common property of all layer systems it can clearly be seen that the maximum $r(\lambda)$ value of the reflection does not excees a value of 6% in the range between 330 nm and 380 nm while the mean reflection $\bar{r}(\lambda)$ calculated by $$\bar{r}(\lambda) = \int r(\lambda) d\lambda / \int d\lambda$$

is less than 3% over this wavelength range. In the range between 290 nm and 330 nm the maximum value of the reflection exceeds the value of 25% with the mean reflection over this range being greater than 15%. The fall below 290 nm, which occurs with some reflection curves, is without meaning as radiation plays no role in this wavelength range due to the absorption properties of the atmosphere.

The invention has been described by means of examples above. However, it goes without saying that within the central idea according this invention, the life, the kinetics and, when differently colouring photochromic substances are used, the colour impression can be influenced by a suitable design of the anti-reflection film and that the most varied modifications are possible.

For example, the layer system in accordance with the invention can not only be used for photochromic optical elements with a refractive index of around 1.5 but also for elements with a higher refractive index. It is also possible to use the most varied materials with other refractive indices instead of the high-index materials shown in the examples as long as the other refractive indices are greater than or equal to 2.0. Different high-index materials can also be used on one layer system.

However, in each case it is of particular advantage to keep to the condition for the thickness ratio given according to this invention. But it also goes without saying that the relationship given need only be met within certain, material-dependent tolerances.

In addition, optical elements can also be coated which do not consist of an organic material as long as the photochromic substances they contain have similar properties to those given above.

We claim:

1. An anti-reflection film of several alternative inorganic layers on an optical element consisting of an organic material with photochromic properties characterized by the fact that the mean reflection of the film over the range between 330 nm and 380 nm is less than 4%; the mean reflection over the range between 290 nm and 330 nm is greater than 15%; and the film has at least five layers which consist alternately of silicon dioxide and a metal oxide material with a high refractive index of $n \geq 2.0$, and of which the first layer applied directly to the optical element consists of silicon dioxide and has a thickness of about $\lambda/2$, the thicknesses of the second, third and fourth layers behave as

1:2Y:20Z/3 where $Y = X + 1.5(n_e - 1.8);\ Z = X \pm 0.2;$ $X = 1.05 + (n_e - 2)1/(4 - n_e)$ and the sum of the thicknesses of the second to fourth layer is also about $\lambda/2$ with the fifth layer being a $\lambda/4$ layer ($\lambda = 350$ nm).

2. A film according to claim 1, characterised by the fact that the first layer is split up into three partial layers consisting of silicon dioxide, the high-index material and again silicon dioxide, and that the thickness of the middle high-index layer is $\lambda/100$ to $\lambda/50$.

3. A film according to claim 2, characterised by the fact that the high-index material is neodymium oxide, titanium oxide or terbium oxide.

4. A film according to claim 1, characterized by the fact that the high-index material is neodymium oxide, titanium oxide or terbium oxide.

5. An anti-reflection film of several alternative inorganic layers on an optical element consisting of inorganic material with photochromic properties characterized by the fact that the mean reflection of the film over the range between 330 nm and 380 nm is less than 4%; the mean reflection over the range between 290 nm and 330 nm is greater than 15%; the optical element is a spectacle lens; and the film is composed of at least three alternative layers, a first layer being silicon dioxide, a second layer being a metal oxide having a refractive index of $n \geq 2.0$ and a third layer being silicon dioxide.

6. A film according to claim 5, wherein the metal oxide is neodymium oxide, titanium oxide or terbium oxide.

* * * * *